Jan. 7, 1964  E. D. ALDERSON  3,116,756
DIVERTER VALVE MEANS
Filed Jan. 26, 1962
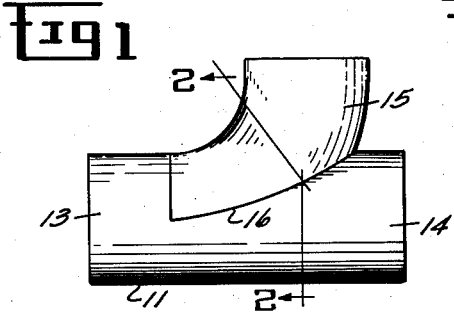
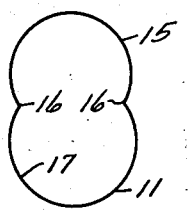
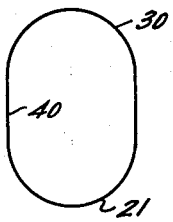
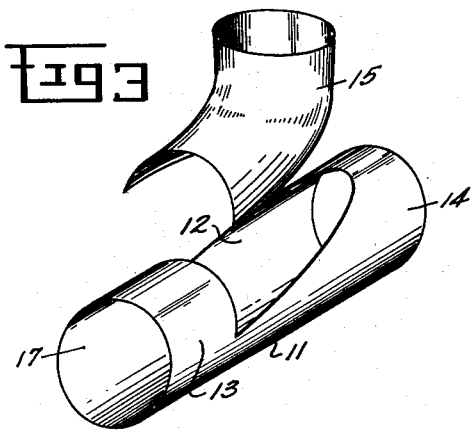
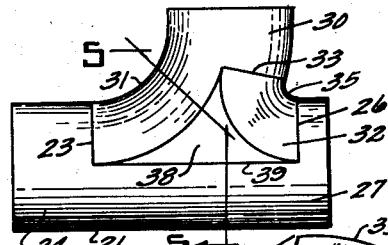
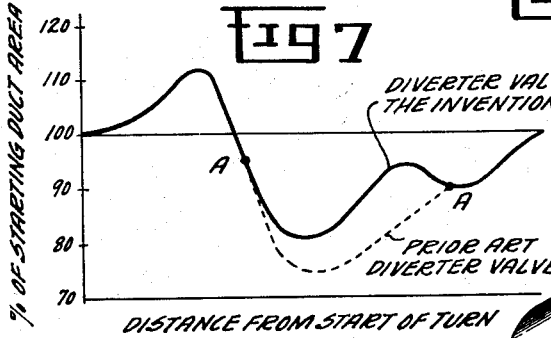
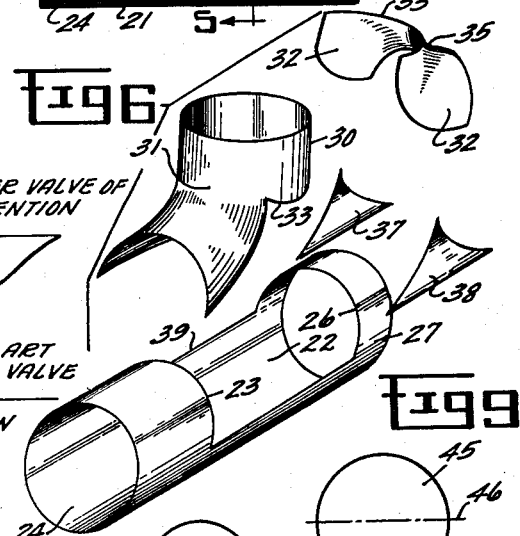
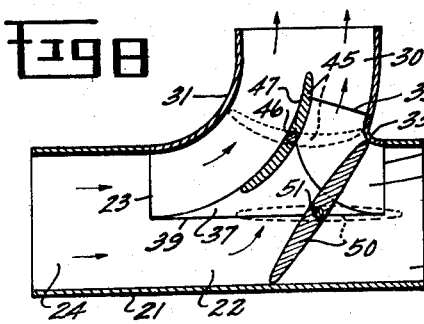
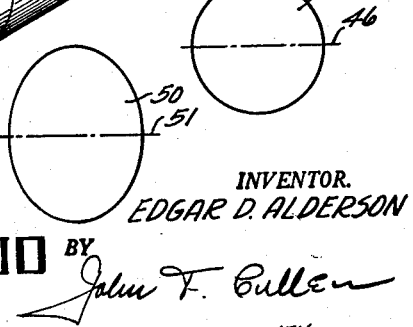
INVENTOR.
EDGAR D. ALDERSON
BY
John F. Cullen
ATTORNEY

United States Patent Office 3,116,756
Patented Jan. 7, 1964

3,116,756
DIVERTER VALVE MEANS
Edgar D. Alderson, Cincinnati, Ohio, assignor to General
Electric Company, a corporation of New York
Filed Jan. 26, 1962, Ser. No. 169,027
6 Claims. (Cl. 137—610)

The present invention relates to a diverter valve and more particularly to a diverter valve having improved seal and flow characteristics.

In aircraft that are adapted to take off and land in a vertical direction, thrust required to lift the aircraft from the ground may be supplied by means of a lift fan mounted within a passage extending through the airframe. The lift fan is generally driven by hot propelling gases that are ducted from a gas generator such as, for example, the combustor of a conventional aircraft gas turbine engine. The hot gases are diverted to a scroll arrangement adjacent the lift fan periphery by means of a diverter valve portion. The diverter valve portion should provide a smooth change in the direction of flow of the hot gases that in normal horizontal flight would be ducted to discharge through a nozzle means generally aligned with the longitudinal axis of the gas generator and the aircraft.

Accordingly, it is an object of the invention to provide a new and improved diverter valve and conduit therefor. Similarly, known systems, other than the lift fan system, may use the diverter valve to redirect exhaust gases for lift augmentation.

Another object of the invention is to provide a new and improved diverter valve conduit having improved area distribution with less variation and diffusion.

A further object of the invention is to provide a new and improved diverter valve conduit having improved wall contours with less abrupt changes of flow direction.

Yet another object of the invention is to provide a new and improved structural arrangement of diverter valve for ease of manufacture.

An additional object of the invention is to provide a new and improved diverter valve having improved valve or door sealing characteristics.

Briefly, in accordance with the invention, the diverter valve conduit comprises a wall defining a conduit portion having upstream and downstream sections and further having an aperture with a generally upstream peripheral segment and a downstream peripheral segment. A first elbow shell is adapted to engage said upstream segment and extend outwardly from said wall. A second elbow shell is adapted to engage said downstream segment and extend outwardly from said wall to engage said first shell whereby the respective bights of said first and second shells open generally toward said associated upstream and downstream sections. A pair of flat generally triangular members are spaced apart and adapted to engage said first and second elbow shells and the conduit along the aperture to form a fluid tight branch portion in the diverter valve. The diverter valve has first and second pivotal valve or door means positioned in said conduit and branch portions to selectively divert a fluid flow from said conduit portion through said branch portion. Each of said first and second valve means have a respective pivotal axis that bears upon each of said opposed triangular members which are positioned in the diverter valve generally transverse to the deflection axis of said branch portion.

The organization and operation together with further objects and advantages of the invention may best be understood by reference to the following description taken in connection with the accompanying drawings, in which:

FIG. 1 is an elevational view of a prior art form of diverter valve conduit;
FIG. 2 is a sectional view along the line 2—2 of FIG. 1;
FIG. 3 is an exploded perspective view of the prior art form of diverter valve conduit shown by FIG. 1;
FIG. 4 is an elevational view of a diverter valve conduit formed in accordance with the invention;
FIG. 5 is a sectional view along the line 5—5 of FIG. 4;
FIG. 6 is an exploded perspective view of the diverter valve conduit shown by FIG. 4;
FIG. 7 is a graphic comparison of area distributions realized by the prior art form of diverter valve shown by FIG. 1 and the diverter valve of the invention shown by FIG. 4;
FIG. 8 is a longitudinal sectional view of the diverter valve shown by FIG. 4 with diverter means positioned therein;
FIG. 9 is a plan view of one of the diverter means positioned in the diverter valve shown by FIG. 8; and,
FIG. 10 is a plan view of another of the diverter means positioned in the diverter valve shown by FIG. 8.

Referring to the drawings, and particularly to FIGS. 1–3, a prior art form of diverter valve conduit has a cylinder or conduit portion 11 with a longitudinally extending aperture 12 formed therein. The conduit 11 has a generally upstream section 13 and a downstream section 14 determined by the direction of a fluid flowing through the conduit. A one piece elbow portion 15 is adapted to be secured to the periphery of the aperture 12 to form a juncture line 16. The elbow portion 15 can be secured at the juncture line 16 by any known means, for example, by a welding process. The prior art form of diverter valve thus formed develops a generally figure-of-eight inner wall contour 17 as best shown by FIG. 2. The inner wall contour 17 along line 2—2 of FIG. 1 is generally midway from the start of the turn of the elbow portion 15. The inner wall contour 17 causes relatively abrupt changes in flow direction of the fluid flowing through the diverter conduit of FIGS. 1–3. These changes in the flow direction will result in pressure losses and distortions of the fluid flow which are undesirable.

The improved diverter valve conduit formed in accordance with the invention is shown by FIGS. 4–6. A conduit portion 21 has a longitudinally extending aperture 22 with an upstream peripheral segment 23 correlated to a generally upstream section 24. The aperture 22 also has a downstream peripheral segment 26 associated with a generally downstream section 27. The upstream section 24 and the downstream section 27 of the conduit portion 21 are determined by the direction of a fluid flowing through the conduit.

A branch portion of the diverter valve conduit of the invention is formed from a plurality of parts which include an elbow shell 30 adapted to engage a portion of the upstream peripheral segment 23 of the aperture 22. The bight 31 of the elbow shell 30 is generally formed to open toward the associated upstream section 24 of the conduit portion 21. The branch portion further has an elbow shell 32 adapted to engage a portion of the downstream segment 26 of the aperture 22 and also engage the elbow shell 30 along a juncture lne 33. The bight 35 of the elbow shell 32 is generally formed to open toward the associated downstream section 27 of the conduit portion 21. In the improved diverter valve conduit being described and as shown by FIG. 4, the bight 31 has a radius of curvature greater than the radius of curvature of the bight 35 to further define improved inner wall contours of the conduit with less abrupt changes of flow direction. Opposed flat, generally triangular members 37 and 38 are individually adapted to engage the elbow shells 30 and 32 and to engage the edge 39 of conduit 21 along the aperture 22 to complete the branch portion being described. The elbow shells 30 and 32, and the triangular members 37 and 38 can be secured along the respective juncture lines by a welding process or other suitable means to develop the fluid tight branch portion extending generally outwardly from the conduit portion 21 of the improved diverter valve conduit.

The diverter valve conduit formed in accordance with the invention develops a generally flat-sided oval inner wall contour 40 as shown by FIG. 5. The lines 5—5 of FIG. 4 relates to the line 2—2 of FIG. 1 and is similar in the aspect that line 5—5 is generally midway from the start of the turn of the branch portion of the improved diverter valve. The improved inner wall contour 40 provides improved area distribution through the diverter valve which has less area variation and less diffusion resulting in lower pressure losses and distortions. Further, the improved inner wall contour 40 causes less abrupt changes in flow direction of a fluid flowing through the improved diverter valve of the invention.

The manufacturing ease realized when the respective structural elements of the improved diverter valve conduit are secured together particularly by a welding process, is substantial over the prior art form of diverter valve as shown by FIGS. 1–3 as previously described. The weld joints of the improved diverter valve shown by FIGS. 4–6 are straight butt welds instead of the inside corner welds that would be required in the prior art form of diverter valve conduit. Fixturing of the improved diverter valve conduit is also more readily accomplished, while the absence of fillet pieces and stiffeners further reduces manufacturing complexity. Elimination of the fillet pieces and the stiffeners also minimizes thermal differential problems and prevents buckling of the diverter valve wall.

A comparison of the starting duct area of the prior art form of diverter valve conduit shown by FIGS. 1–3 and the improved diverter valve conduit of the invention shown by FIGS. 4–6, as previously described, is shown by FIG. 7. It is apparent from the plotted curves based upon test results that an increase in the percent of starting duct area is realized by the improved diverter valve of the invention between points A—A.

FIG. 8 shows one form of valve means positioned within the improved diverter valve conduit as shown by FIGS. 4–6 and as previously described. One valve or door means 45 has a pivotal axis 46 which bears upon suitable bearing pads, not shown, that are positioned on the previously described flat triangular members such as the triangular member 37. The valve has an arcuate configuration with a concave surface 47 generally associated with the upstream section 24 of the improved diverter valve. Thus the valve 45, when in the solid line position, also serves as a guide vane to assist in developing a smooth fluid flow through the improved diverter valve of the invention. The valve 45 in the form shown by FIGS. 8 and 9 is generally circular but in accordance with the invention may have any peripheral configuration conforming to the related inner wall contour whereby valve 45 will serve as a desired seal when in the dashed line position.

A second valve or door means 50 has a pivotal axis 51 and, similar to the pivotal axis 46 of valve means 45, bears upon suitable bearing pads, not shown, which also may be positioned on the flat triangular members such as the triangular member 37. Valve means 50 is generally oval as shown by FIG. 10 but may have any peripheral configuration to provide a desired seal when in the solid line position as shown by FIG. 8. Further, valve 50 may be substantially flat in an end view to present a minimum of obstruction to the fluid flow through the diverter valve when both valve 45 and 50 are in the dashed line position. However, if design parameters require that the fluid flow be directed at any angle offset from a normal longitudinal flow through the improved diverter valve, it is considered to be within the concept of the invention to form the valve means 50 into the desired configuration to effect such an angular deflection of the fluid flow.

The bearing pads, as described and as positioned on the flat members 37 and 38, are not part of this invention and therefore have not been structurally shown. The invention being described does provide improved valve clearances and wall contours in the portions of the valve means 45 and 50 that are generally adjacent the bearing pads.

In operation, the improved diverter valve of the invention directs a fluid flow longitudinally through the diverter valve when the valve means 45 and 50 are positioned in the dashed line positions as shown by FIG. 8. When it is desired to divert the longitudinal fluid flow through the branch portion, formed as previously described and shown by FIGS. 4–6, the valve means 45 and 50 are positioned in the solid line positions shown by FIG. 8. Effective seal contact surfaces about the perimeters of each of the valve means 45 and 50 are realized by the improved diverter valve conduit of the invention which develops the flat-sided oval inner wall contour 40 as previously described and shown by FIG. 5. The seal contact surface or perimeter at the rear of each valve or door 45 and 50 is substantially perpendicular to the plane of the door so that valve deflections due to stress or thermal gradient will develop minimal changes in the seal gap. The perpendicular seal contact surface further requires less seal travel when the valve means 45 and 50 are moved to either the solid or dashed line positions shown by FIG. 8.

The flat triangular members 37 and 38 contribute to the flat-sided oval inner wall contour 40 and provide the desirable flat surfaces for the aforementioned bearing pads that receive the respective valve pivotal axis 46 and 51.

As will be evidenced from the foregoing description, certain aspects of the invention are not limited to the particular details of the constructions illustrated. It is contemplated that other modifications and applications will occur to those skilled in the art and it is, therefore, intended that the appended claims shall cover such modifications and applications that do not depart from the true spirit and scope of the invention.

Having thus described the invention, what is claimed is:

1. A diverter valve conduit having a conduit elbow portion comprising,
    (a) a wall defining a conduit portion having upstream and downstream sections,
    (b) an aperture in said wall having a generally upstream peripheral segment and a downstream peripheral segment,
    (c) a first elbow shell engaging said upstream peripheral segment to extend outwardly from said wall,
    (d) a second elbow shell engaging said downstream peripheral segment to extend outwardly from said wall towards said first shell and engage therewith,
    (e) respective bights of said first and second shells opening generally towards said associated upstream and downstream sections, and
    (f) a pair of flat generally triangular members spaced apart and individually engaging said first and second elbow shells and said conduit portion along said aperture to form a fluid tight branch portion in the diverter conduit portion.

2. The diverter valve conduit of claim 1 in which said first elbow shell and second elbow shell and said pair of flat generally triangular members are joined to each other and to said conduit portion by butt welds.

3. The diverter valve conduit of claim 1 including pivotal valve means comprising,
    (a) a first pivotal valve means positioned in said branch portion and arranged to selectively seal said branch portion, said first valve means having a concave surface generally associated with said upstream section and further having a pivotal axis bearing upon said flat triangular members, (b) and a second pivotal valve means positioned in said conduit portion and arranged to selectively seal said conduit portion when said first valve means is open, said second valve means having a substantially flat configuration and further having a pivotal axis bearing on said flat triangular members.

4. A diverter valve conduit having a conduit elbow portion comprising, (a) a wall defining a conduit portion having upstream and downstream sections, (b) an aperture in said wall having a generally upstream peripheral segment and a downstream peripheral segment, (c) a first elbow shell engaging said upstream peripheral segment to extend outwardly from said wall, (d) a second elbow shell engaging said downstream peripheral segment to extend outwardly from said wall towards said first shell and engaged therewith, (e) said first elbow shell having a bight with a radius of curvature greater than the radius of curvature of the bight of said second elbow shell, (f) respective bights of said first and second shells opening generally towards said associated upstream and downstream sections, and (g) a pair of flat generally triangular members spaced apart and individually engaging said first and second elbow shells and said conduit portion along said aperture to form a fluid tight branch portion in the diverter conduit portion.

5. The diverter valve conduit of claim 4 in which said first elbow shell and second elbow shell and said pair of flat generally triangular members are joined to each other and to said conduit portion by butt welds.

6. The diverter valve conduit of claim 4 including pivotal valve means comprising:

(a) a first pivotal valve means positioned in said branch portion and arranged to selectively seal said branch portion, said first valve means having a concave surface generally associated with said upstream section and further having a pivotal axis bearing upon said flat triangular members, and (b) a second pivotal valve means positioned in said conduit portion and arranged to selectively seal said conduit portion when said first valve means is open, said second valve means having a substantially flat configuration and further having a pivotal axis bearing on said flat triangular members.

References Cited in the file of this patent

UNITED STATES PATENTS

| | | |
|---|---|---|
| 1,860,346 | Anderson | May 31, 1932 |
| 2,533,720 | Danel | Dec. 12, 1950 |
| 2,947,499 | Douglas | Aug. 2, 1960 |
| 3,053,482 | Matthews | Sept. 11, 1962 |

FOREIGN PATENTS

| | | |
|---|---|---|
| 1,041,060 | France | May 27, 1953 |